Patented Oct. 6, 1925.

1,556,038

UNITED STATES PATENT OFFICE.

SPERANZA SÉAILLES, NÉE CALOGÉROPOULOS, AND JEAN SÉAILLES, OF PARIS, FRANCE, ASSIGNORS TO SOCIÉTÉ ANONYME "L A P," OF PARIS, FRANCE.

PROCESS FOR THE USE OF MIXTURES OF ALUMINOUS CEMENTS WITH ORDINARY CEMENTS.

No Drawing. Application filed March 23, 1925. Serial No. 17,773.

*To all whom it may concern:*

Be it known that we, SPERANZA SÉAILLES, NÉE CALOGÉROPOULOS, and JEAN SÉAILLES, both citizens of the Republic of France, and residents of Paris, France, have invented new and useful Improvements in Processes for the Use of Mixtures of Aluminous Cements with Ordinary Cements, which is fully set forth in the following specification.

It is a well-known fact that mixtures of aluminous cements with lime or with hydraulic cements or binding material will afford a product which is so little adapted for use that the manufacturers and also the original promotor of aluminous cements, Mr. Bied, recommend not only that all such mixtures should be avoided, but also that all appliances which have been used for the ordinary cements should be cleaned before using them for aluminous cement, and also that special precautions should be taken (brushing, washing and chiselling) in repairing aluminous cement with ordinary cement.

The present process relates to the determination of the special conditions which afford without any drawbacks the utilization of aluminous cement in connection or in mixture with the known hydraulic binding substances, lime, and chiefly with the normal Portland cements or the high strength Portland cements.

The said process consists in flowing or ramming a more or less thick layer of aluminous cement, mortar or concrete, and in at once covering it with another layer, flowed or rammed, of ordinary cements or hydraulic binding material (as cement, mortar or concrete), without waiting for the setting of the first aluminous layer and without any special precautions in spite of the mixing which necessarily takes place at the contact surfaces. Inversely, the layer of ordinary cement may be put on in the first place and the aluminous layer in the second place. A mould may even receive an aluminous layer, then covering it with a layer of ordinary cement, and ramming or compressing the aggregate of the two layers at the same time.

This process offers great economical and practical advantages by permitting to reduce the quantity of aluminous cement employed, this being expensive, and to limit its use to the places in which it is most advantageous. For example, aluminous facings can be used in construction or for artificial products employed for building purposes. For the construction of surfaces which are subject to wear, a very hard aluminous surface can be placed upon or below an ordinary concrete portion or like means can be employed. Such results can be obtained without any complication, since—taking as an example the manufacture of building stone or paving blocks—it will suffice, with any suitable mould or press, to first fill in one of the said cements and then the other, and after the filling, pressure or ramming, this will afford a combination product formed in a single operation and without the washing, scraping, chiselling or like precautions and the cost of labour which are necessary for repair work or coatings. We may further utilize this double filling for the manufacture of products obtained by the known centrifugal methods.

The said process is further applicable to aluminous cement mixed with lime or with calcareous hydraulic binding substances, in spite of the practically instantaneous setting of such mixtures and their well-known drawbacks. In this case, a modification of our said process consists in forming such mixtures in dry state and in putting them in place also in the dry state, in compressing or if necessary ramming the same in the dry state, and in moistening them only afterwards and when in place. In particular, in the centrifugal processes, the mould is filled with the dry substances and the water is supplied during the rotation.

Also, it is feasible to make use of the known properties of solutions of chloride of calcium in dilute or concentrated solutions, to accelerate or retard the phenomena of setting and hardening by virtue of their variable action upon the solubility of the aluminates.

What we claim is:

1. A process for the use of aluminous cements in connection or in mixture with the ordinary hydraulic cements, which consists in placing in position a layer of aluminous cement and immediately afterwards a layer of ordinary cement.

2. A process for the use of aluminous cements in connection or in mixture with the ordinary hydraulic cements, which consists in placing in position, in the dry state, a layer of aluminous cement and immediately afterwards a layer of ordinary cement, in compressing and ramming the same, and finally in moistening the whole.

3. A process for the use of aluminous cements in connection or in mixture with the ordinary hydraulic cements, which consists in placing in position, in the dry state, a layer of aluminous cement and immediately afterwards a layer of ordinary cement, in compressing and ramming the same, and finally in moistening the whole while rapidly rotating the mold.

4. A process for the use of aluminous cements in connection or in mixture with the ordinary hydraulic cements, which consists in placing in position, in the dry state, a layer of aluminous cement and immediately afterwards a layer of ordinary cement, in compressing and ramming the same, and finally in moistening the whole after the addition of a calcium chloride solution.

In testimony whereof we have signed this specification.

SPERANZA SÉAILLES, NÉE CALOGÉROPOULOS.
JEAN SÉAILLES.